(12) United States Patent
Den et al.

(10) Patent No.: US 7,410,600 B2
(45) Date of Patent: Aug. 12, 2008

(54) LIGHT-EMITTING MATERIAL AND LIGHT-EMITTING ELEMENT

(75) Inventors: Tohru Den, Tokyo (JP); Tomoyuki Oike, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/835,064

(22) Filed: Aug. 7, 2007

(65) Prior Publication Data

US 2008/0029738 A1 Feb. 7, 2008

Related U.S. Application Data

(62) Division of application No. 11/086,422, filed on Mar. 23, 2005, now Pat. No. 7,303,696.

(30) Foreign Application Priority Data

| Mar. 26, 2004 | (JP) | ............................. 2004-092402 |
| Aug. 31, 2004 | (JP) | ............................. 2004-253253 |

(51) Int. Cl.
  *C09K 11/00* (2006.01)
(52) U.S. Cl. .......................... 252/301.4 R; 252/301.4 F
(58) Field of Classification Search ....... 252/301.4 R–301.6 F
  See application file for complete search history.

(56) References Cited

FOREIGN PATENT DOCUMENTS

| JP | 2000-306674 | 11/2000 |
| JP | 2005-063756 | 3/2005 |
| JP | 2005-063790 | 3/2005 |

OTHER PUBLICATIONS

Chemical Abstract citation 1974: 19979, Kislyakov et al, "Phase diagram of the zinc oxide-tungsten trioxaide system", Izvestiya Vysshikh Uchebnykh Zavedenii, Khimiya i Khimicheskaya Tekhnologiya 1973, 16(9), pp. 1440.*
Merino et al, "Mircostructure-size dependence of the 1.520 m Er3+ luminescence lifetime in AI2O3-ZrO2 eutectic melt growth", Appl. Phys. Lett. 80 (4), Jan. 28, 2002, pp. 599-591.*
Wieczorek, et al., "Composite Polyether Electrolytes with Lewis Acid Type Additives"; J. Phys. Chem. B, vol. 102, No. 2,352-360 (1998).
Steenhuis, et al., "Difference FT-IR Studies of Photoassembly in the Manganese-Containing Catalytic Site of Photosystem II"; J. Phys. Chem. B, vol. 102, No. 1, 4-8 (1998).
Lin, et al., "Formation of Mesoporous SIlica Nanotubes"; Adv. Materials, vol. 12, No. 2, 103-106 (2002).
Merino, et al., "Microstructure-size dependence of the 1.520 m Er3+ luminescence lifetime in A1203-Zr02 eutectic melt grown composite", App. Phys. Lett. vol. 80, #4,Jan. 2002, pp. 589-591.
Chemical Abstract citation 1974: 19979.

\* cited by examiner

*Primary Examiner*—C. Melissa Koslow
(74) *Attorney, Agent, or Firm*—Fitzpatrick, Cella, Harper & Scinto (57) ABSTRACT

A light-emitting material includes a matrix section 12 and light-emitting sections 11 dispersed and buried in the matrix section. The matrix section 12 comprises a first material and the light-emitting sections comprise a second material showing a eutectic relationship with the first material.

3 Claims, 7 Drawing Sheets

LIGHT-EMITTING MATERIAL AND LIGHT-EMITTING ELEMENT

BACKGROUND OF THE INVENTION

1. Field of the Invention

This invention relates to a light-emitting material containing a nano-phosphor, a light-emitting element using the same and a method of manufacturing the same.

2. Related Background Art

Flat panel displays (FPD) realized by using phosphor thin films and phosphor powders having a light-emitting effect have been and are attracting attention. Flat panel displays include plasma displays (PDP), field emission displays (FED) and, electro-luminescent displays (ELD). Such phosphors that are used for displays of a specific type are required to match the characteristic features of the displays.

Phosphors that have been prepared are conventionally produced by adding one or more than one transition metals and/or one or more than one rare earth elements as luminescent center to oxides or sulfides as matrix. Examples of known phosphors for inorganic EL include ZnS:Mn, SrS:Ce, Eu, CaS:Eu, ZnS:Tb,F, CaS:Ce, SrS:Ce, $CaGa_2S_4$:Ce, $BaAl_2S_4$:Eu, $Ga_2O_3$:Eu, $Y_2O_3$:Eu, $Zn_2SiO_4$:Mn and $ZnGa_2O_4$:Mn. Examples of other phosphors that have been prepared include $Y_2O_2S$:$Eu^{3+}$, $Gd_2O_2S$:$Eu^{3+}$, $YVO_4$:$Eu^{3+}$, $Y_2O_2S$:Eu,Sm, $SrTiO_3$:Pr, $BaSi_2Al_2O_8$:$Eu^{2+}$, $BaMg_2Al_{16}O_{27}$:$Eu^{2+}$, $Y_{0.65}Gd_{0.35}BO_3$:$Eu^{3+}$, $La_2O_2S$:$Eu^{3+}$, Sm, $Ba_2SiO_4$:$Eu^{2+}$, $Zn(Ga,Al)_2O_4$:Mn, $Y_3(Al,Ga)_5O_{12}$:Tb, $Y_2SiO_5$:Tb, ZnS:Cu, $Zn_2SiO_4$:Mn, $BaAl_2Si_2O_8$:$Eu^{2+}$, $BaMgAl_{14}O_{23}$:$Eu^{2+}$, $Y_2SiO_5$:Ce and $ZnGa_2O_4$:Mn.

Inorganic EL displays are among the displays that are attracting attention because polycrystalline inorganic phosphors can be used for them to provide a large display area with relative ease and they show an enhanced durability in the operating environment. Efforts for developing full color EL displays that utilize in organic EL have been paid in recent years although no highly efficient phosphor showing a high degree of color purity and a high luminance level has so far been obtained. Therefore, it is indispensable to develop a high performance phosphor in order to realize a full color inorganic EL display.

Meanwhile, the light-emitting characteristics of very small particles of semiconductors such as Si, Ge and II-VI compounds having a diameter not greater than tens of several nanometers that are attributable to the quantum size effect have been made clear in recent years. The quantum size effect is believed to be derived from the fact that very fine particles of semiconductors with nano-crystal structure have a band gap greater than that of bulk semiconductors. As a remarkable example, it has been observed that light emitted from CdSe semiconductor fine particles tends to show a shorter wavelength as the particle diameter is reduced. Additionally, light emitted from semiconductor fine particles shows a high luminance level because their light-emitting life is very short and not longer than 10 ns and light is absorbed and radiated in a very short period of time.

Very fine particles of semiconductors as described above can be produced in an aqueous solution (Journal of Physical Chemistry, B, Vol. 102, p. 8,360 (1998)). A technique for fixing very fine particles of a semiconductor generated in an aqueous solution to a solid matrix of a polymer has been proposed (Advanced Material, vol. 12, p. 1,103 (2000)). However, since polymers are poorly resistant to light and heat, the very fine particles fixed to polymers may easily become degraded.

SUMMARY OF THE INVENTION

In view of the above-identified technological background, it is therefore an object of the present invention to provide a novel light-emitting material.

According to the invention, the above object is achieved by providing a light-emitting material including: a matrix section and light-emitting sections dispersed and buried in the matrix section; the matrix section comprising a first material, the light-emitting sections comprising a second material showing a eutectic relationship with the first material.

Preferably, said light-emitting sections are granular or cylindrical and have pointed apexes.

In another aspect of the present invention, there is provided a light-emitting element comprising: a light-emitting layer and a pair of electrodes arranged so as to sandwich the light-emitting layer; the light-emitting layer including a matrix section and light-emitting sections dispersed and buried in the matrix section; the matrix section comprising a first material, the light-emitting sections comprising a second material showing a eutectic relationship with the first material.

In still another aspect of the invention, there is provided a structure comprising a base body including light-emitting sections adapted to emit light in response to a voltage applied thereto and comprising at least one of two or more than two materials constituting a eutectic composition and a second section comprising a material or materials of the eutectic composition other than the material or materials of the light-emitting sections, said light-emitting sections having a profile adapted to give rise to a quantum effect attributable to confined movements of electrons.

In still another aspect of the invention, there is provided a light-emitting material of a eutectic composition, at least one of the constituent materials of the eutectic composition forming light-emitting sections, the light-emitting sections-being in the form of fine particles surrounded by the remaining material or materials of the eutectic composition.

There is also provided a light-emitting material of a eutectic material, at least one of the constituent materials of the eutectic composition forming light-emitting sections, the light-emitting sections being in the form of cylinders surrounded by the remaining material or materials of the eutectic composition. The ends of the cylinders of the light-emitting sections may have pointed apexes or may be narrowed.

Preferably, the size of each light-emitting section is not greater than 1 μm. Preferably, a light-emitting material according to the invention is in the form of a thin film. Preferably, a light-emitting material according to the invention comprises oxides. When a light-emitting material according to the invention comprises oxides, various combinations of oxides can be used for the purpose of the invention. Examples of combinations of oxides include (1) magnesium oxide and an oxide of a rare earth element, (2) nickel oxide and an oxide of a rare earth element, (3) vanadium oxide and a vanadium composite oxide containing a rare earth element, (4) silicon oxide and a silicon composite oxide containing a rare earth element and (5) tungsten oxide or zinc oxide and a tungsten composite oxide containing zinc.

More preferably, a light-emitting material according to the invention is in the form of a thin film with a thickness not greater than 5 μm and the size of each light-emitting section thereof is not greater than 100 nm.

In still another aspect of the present invention, there is provided a light-emitting element formed by using the light-emitting material described above, which may be an inorganic EL element.

In still another aspect of the present invention, there are provided an image display apparatus, an illumination apparatus and a printing apparatus comprising the light-emitting element described above.

In still another aspect of the present invention, there is provided a method of manufacturing the light-emitting material.

In a further aspect of the invention, there is provided a method of manufacturing a light-emitting material by forming a film of the light-emitting material on a substrate, said method comprising a step of forming a film of a eutectic material typically by sputtering, at least one of the constituent materials of the eutectic composition forming light-emitting sections, the light-emitting sections being in the form of fine particles surrounded by the remaining material or materials of the eutectic composition. Preferably, the temperature of the substrate is not lower than 400° C. during the film forming process.

There is also provided a method of manufacturing a light-emitting material by forming a film of the light-emitting material on a substrate, said method comprising a step of forming a film of a eutectic material typically by sputtering, at least one of the constituent materials of the eutectic composition forming light-emitting sections, the light-emitting sections being in the form of cylinders surrounded by the remaining material or materials of the eutectic composition. Preferably, the temperature of the substrate is not lower than 400° C. during the film forming process.

Thus, according to the invention, it is possible to provide a novel light-emitting material. Since light-emitting sections in the form of fine particles or cylinders are dispersed in a matrix section, the light-emitting efficiency is much improved if compared with a light-emitting material where light-emitting sections are held in close vicinity or agglomerated.

DESCRIPTION OF THE PREFERRED EMBODIMENTS

Now, the present invention will be described by referring to the accompanying drawings that illustrate preferred embodiments of light-emitting material according to the invention.

For the purpose of the present invention, the expression that the first material and the second material show a eutectic relationship refers to that the two materials have a relationship where crystal A (of the first material) and crystal B (of the second material) will solidify simultaneously at a given temperature in a phase diagram of the two materials.

For the purpose of the present invention, the expression of a eutectic composition refers not to the composition of the component elements of a corresponding eutectic material but to the composition of the compounds or the alloys of each region separately formed by a eutectic effect in a eutectic material. Additionally, the expression of the size of light-emitting sections refers to the average of the diameters of the light-emitting sections buried in a matrix if the light-emitting sections are formed by fine particles. The expression of the size of light-emitting sections also refers to the average of the diameters of the light-emitting sections buried in a matrix if the light-emitting sections are formed by cylindrical pieces.

FIGS. 1A, 1B, 2A, 2B and 3A through 3C schematically illustrate examples of thin film light-emitting materials.

Figure 1A:
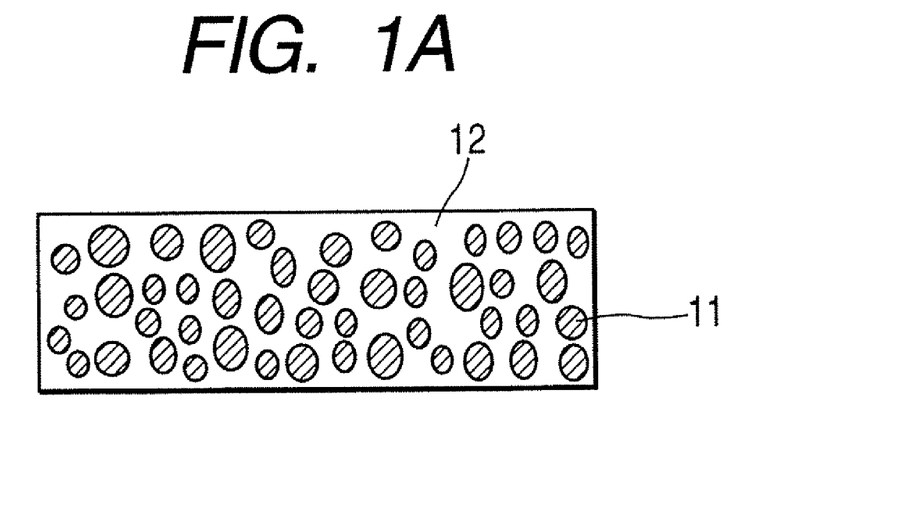
FIGS. 1A and 1B are schematic illustrations of a light-emitting material according to the invention and having light-emitting sections that appear to be so many fine particles.
Figure 1B:
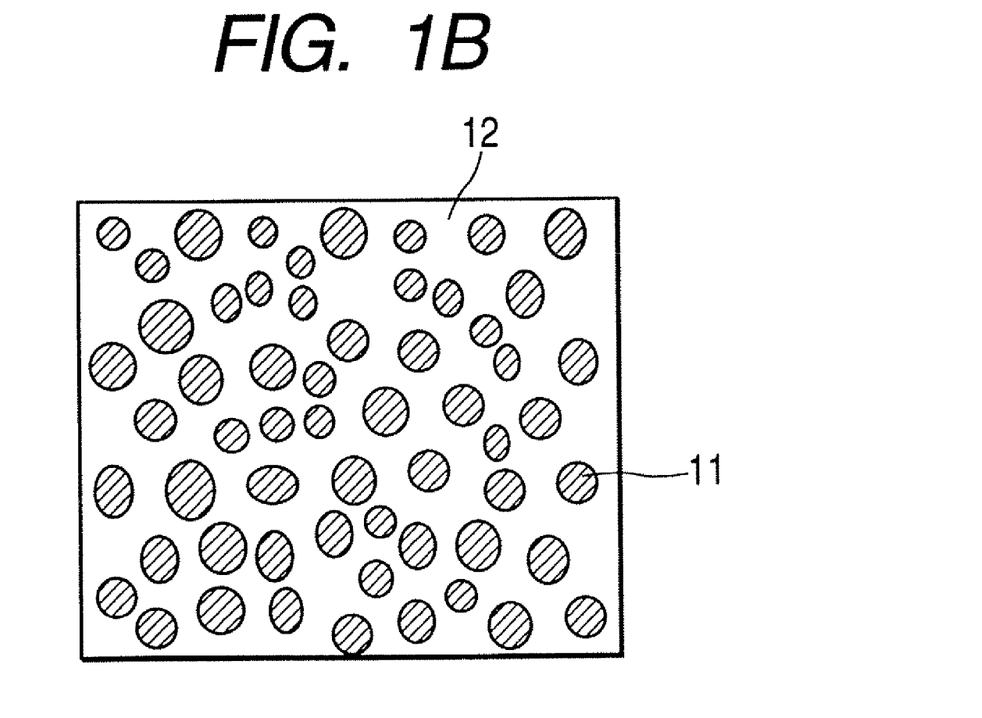
Figure 2A:
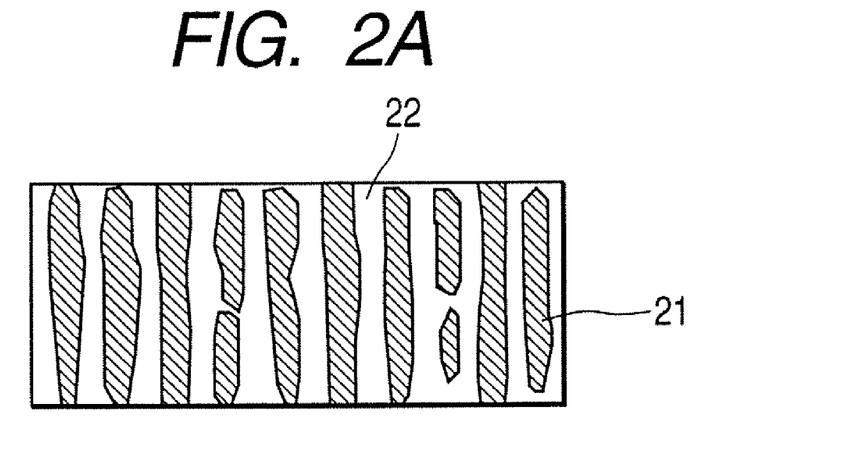
FIGS. 2A and 2B are schematic illustrations of a light-emitting material according to the invention and having light-emitting sections that appear to be so many cylinders.
Figure 2B:
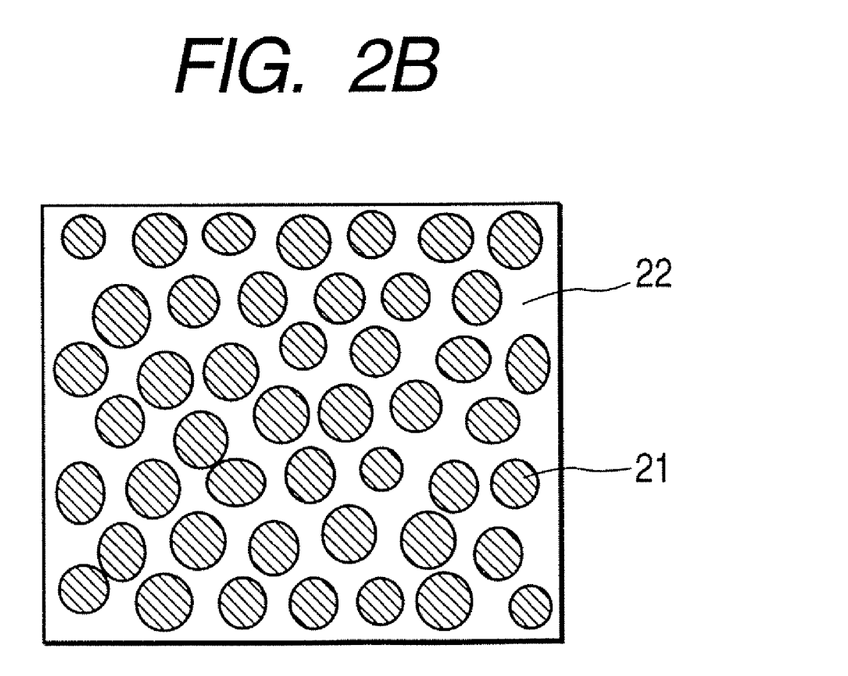
Figure 3A:
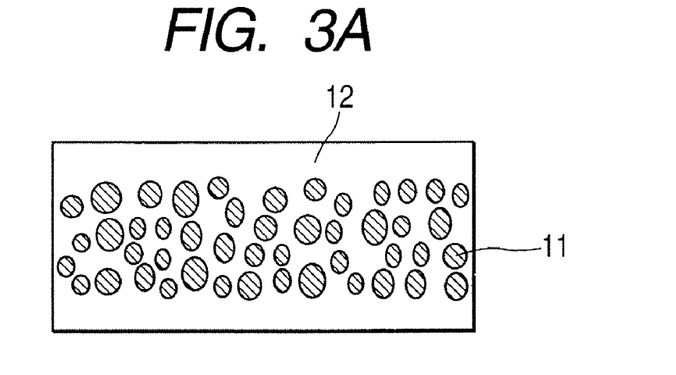
FIGS. 3A, 3B and 3C are schematic illustrations of a special light-emitting material according to the invention.
Figure 3B:
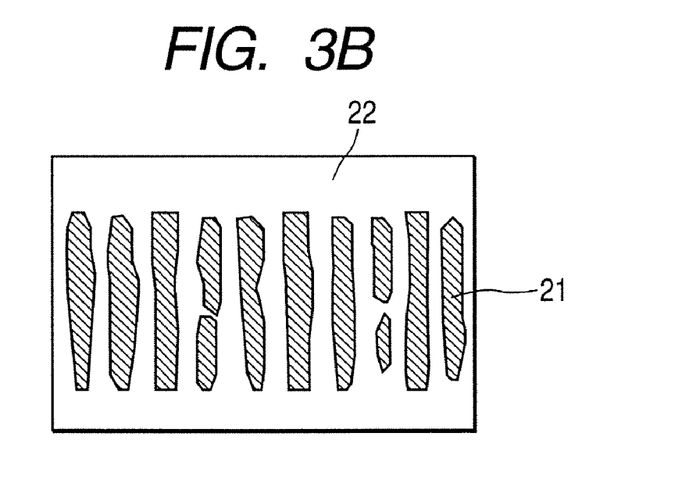
Figure 3C:
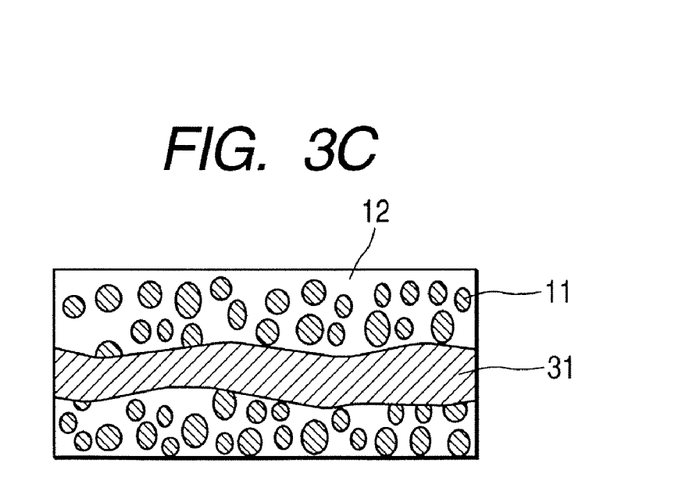

FIGS. 1A and 1B illustrate a light-emitting material having light-emitting sections that appear to be so may fine particles and FIGS. 2A and 2B illustrate a light-emitting material having light-emitting sections that appear to be so many cylinders. FIGS. 3A through 3C illustrate a special light-emitting material having light-emitting sections only in part of the thin film of the light-emitting material. In the drawings, 11 denotes a light-emitting section that appears to be a fine particle and 21 denotes a light-emitting section that appears to be a cylinder, whereas 12 and 22 refer to a matrix section and 31 refers to a thin film light-emitting section.

FIG. 1A is a schematic cross sectional view of a thin film of the light-emitting material in which phosphor sections appear to be so many fine particles and FIG. 1B is a schematic plan view of the thin film. If the eutectic materials are compound A and compound B, the light-emitting sections 11 that appear to be so many fine particles are formed by the compound A, whereas the matrix section 12 is formed by the compound B. While the optimal size of the light-emitting sections depends on the type of the compound A and the configuration of the element realized by applying the thin film, it is preferably not greater than 1 μm, more preferably not smaller than 0.5 nm and not greater than 100 nm. While the volume density of the fine particles is not particularly limited, the overall specific volume density is preferably not lower than 10% and not higher than 70% because the light-emitting efficiency is reduced when fine particles are distributed too sparsely. The fine particles may be dispersed randomly or regularly.

FIG. 2A is a schematic cross sectional view of a thin film of the light-emitting material in which phosphor sections appear to be so many fine cylinders and FIG. 2B is a schematic plan view of the thin film. While the cylinders show a substantially cylindrical profile, they may be slightly bent or discontinued at a middle part as shown in FIG. 2A. While the optimal diameter of the cylinders depends on the types of the compounds and the configuration of the element realized by applying the thin film, it is preferably not greater than 1 μm, more preferably not smaller than 0.5 nm and not greater than 100 nm. While the volume density of the cylinders is not particularly limited, the overall specific volume density is preferably not lower than 10% and not higher than 70% because the light-emitting efficiency is reduced when cylinders are distributed too sparsely. The cylinders may be dispersed randomly or regularly.

Figure 7:
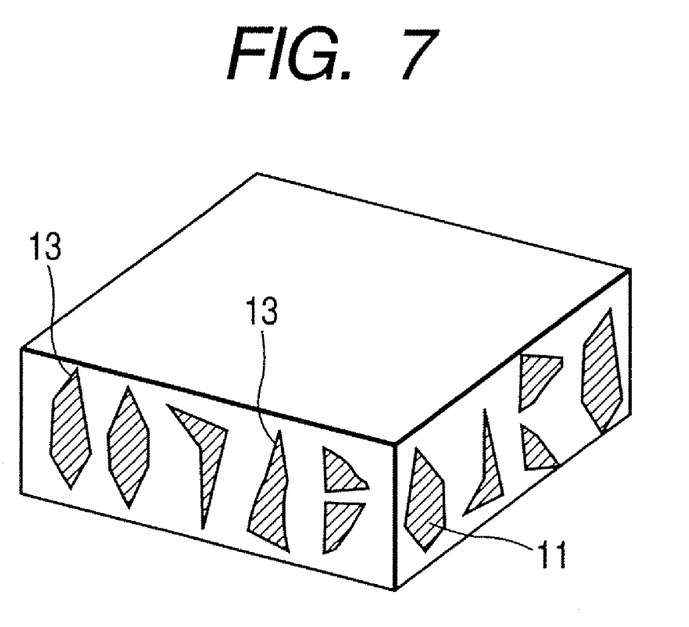
FIG. 7 is a schematic perspective view of a light-emitting material having pointed apexes.

FIG. 7 is a schematic perspective view of a light-emitting material in which light-emitting sections are tapered at the opposite ends thereof or have pointed apexes.

FIGS. 3A through 3C are schematic illustrations of other examples of profile of a light-emitting material according to the invention. While FIG. 3A shows light-emitting sections that appear to be so many fine particles as in the case of FIGS.

1A and 1B. However, regions free from light-emitting sections are intentionally formed in FIG. 3A. When it is desired to produce a large effect of accelerating electrons near the interfaces of the electrodes in an inorganic EL element, there are occasions in which it is desirable to produce regions that are free from light-emitting sections. FIG. 3B shows light-emitting sections that appear to be so many cylinders as in the case of FIGS. 2A and 2B. However, regions free from light-emitting sections are formed at the both ends of the cylinder in FIG. 3B. Finally, FIG. 3C shows light-emitting sections that appear to be so many fine particles as in the case of FIGS. 1A and 1B. However, there are one or more than one light-emitting sections that appear like thin films. As a light-emitting element, this configuration is preferable in some cases.

When a light-emitting material according to the invention is prepared by means of a sputtering process, a structure where light-emitting sections are dispersed in a matrix section can be obtained by controlling the substrate temperature, the film growth rate, the bias voltage applied to the deposition substrate and the gas pressure in the deposition chamber.

To obtain a structure where light-emitting sections are dispersed in a matrix section according to the invention, the volume ratio of the first material (matrix section) and the second material (light-emitting sections) is controlled by changing the content ratio of the component materials of the target. As for the volume rate, the volume of the light-emitting sections is not lower than 10% and not higher than 70%, preferably not lower 30% and not higher than 60%.

When a sputtering process is used, light-emitting sections are not sometimes dispersed in a matrix section and both the first material and the second material may come to appear to be fine particles without becoming a film as a result of agglomeration of fine particles, depending on the film-forming conditions.

In such a case, a structure where light-emitting sections are dispersed in a matrix section can be obtained by raising the substrate temperature and, at the same time, changing the content ratio of the components of the target that contains the first material and the second material (for example, reducing the content of the second material from the target).

When a structure where light-emitting sections are dispersed in a matrix section is obtained and appear to be as so many particles and it is desired to change the light-emitting sections to make them appear to be so many cylinders, it is advisable to reduce the growth rate and/or reduce the gas pressure and/or apply a bias voltage to the substrate.

FIGS. 4A and 4B and FIGS. 5A and 5B are schematic cross sectional views of light-emitting elements according to the invention, where a light-emitting material according to the invention is used for inorganic EL elements. In the figures, 41 denotes a transparent electrically conductive film and 42 and 44 denote a dielectric film, while 43 denotes a phosphor film made of a light-emitting material according to the invention and 45 and 46 respectively denote an electrode film and a substrate.

Figure 4A:
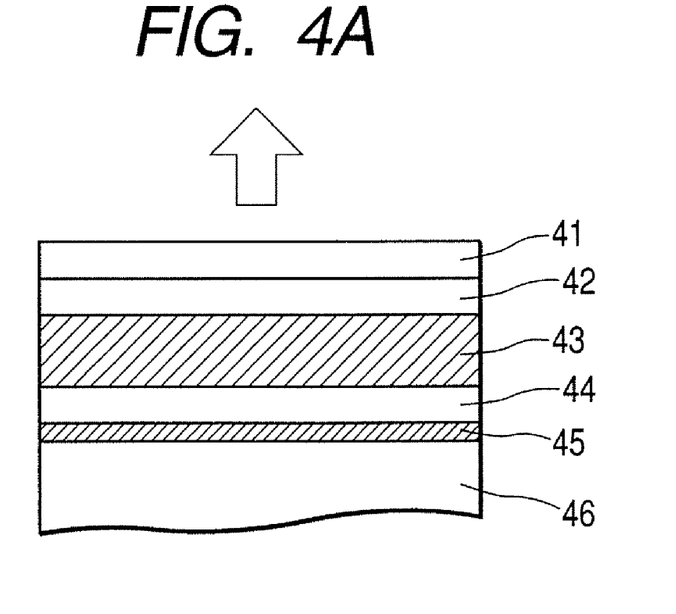
FIGS. 4A and 4B are schematic cross sectional views of light-emitting elements according to the invention.
Figure 4B:
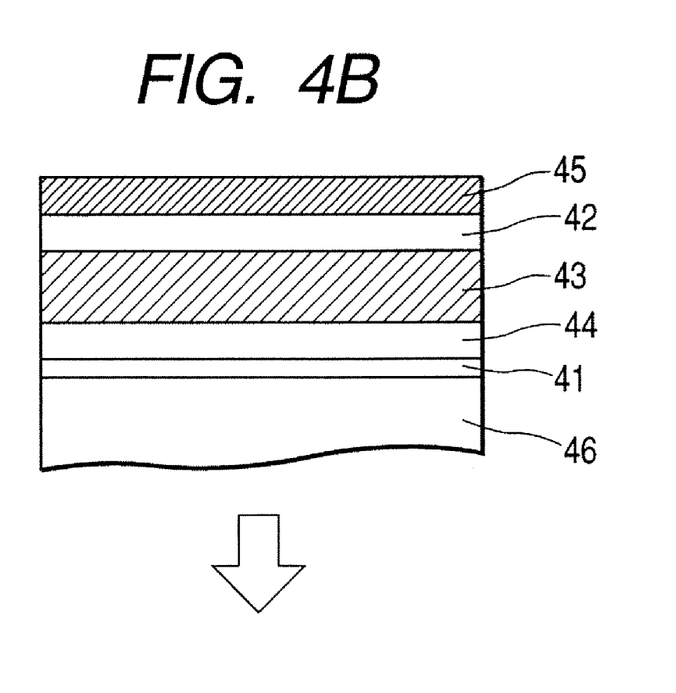
Figure 5A:
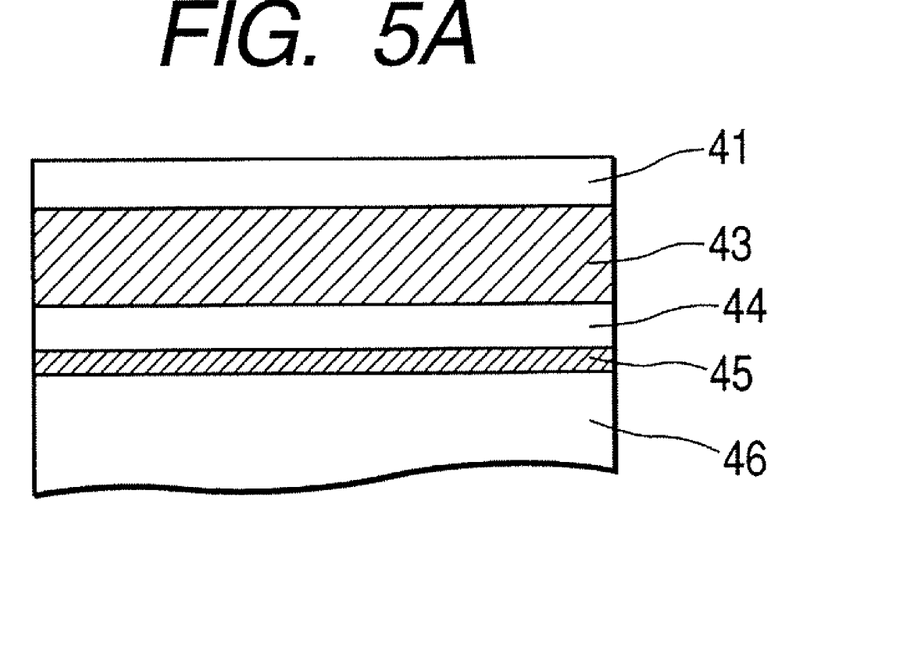
FIGS. 5A and 5B are schematic cross sectional views of other light-emitting elements according to the invention.
Figure 5B:
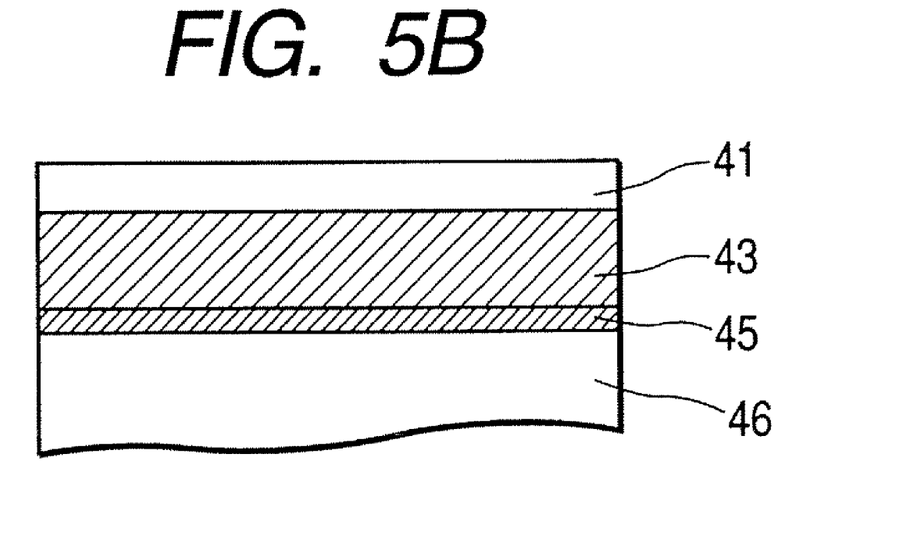

FIG. 4A is a conceptual illustration of an AC-driven inorganic EL element of the type adapted to take out light from the side opposite to the substrate and FIG. 4B is a conceptual illustration of an AC-driven inorganic EL element of the type adapted to take out light from the side of the substrate. FIG. 5A is a conceptual illustration of an AC-driven inorganic EL elements similar to that of FIG. 4A but having only a single dielectric layer. FIG. 5B is a conceptual illustration of a DC-driven inorganic EL element.

A thin film typically made of $BaTiO_3$ can effectively be used as a dielectric film of an AC-driven inorganic EL element. The film thickness of the dielectric film is preferably between 10 nm and 100 μm. Either a metal thin film or a semiconductor thin film can effectively be used as an electrode of a DC-driven inorganic EL element.

When light is taken out from the side of the substrate as in the case of FIG. 4B, the substrate 46 is preferably made of transparent glass or plastic so that it may transmit emitted light. Any type of the substrate may be used when light is taken out from the top surface. Then, glass, plastic or ceramic can be used as the material of the substrate, although the use of non-alkaline glass or ceramic is preferable when the substrate has to be heated.

An electrode layer needs to be provided when a light-emitting element according to the invention is used as an inorganic EL element for emission of light. Materials that can be used for the electrode layer include various metals such as Au, Pt and Ag, alloys and transparent electrically conductive films. Any appropriate process selected from vapor phase reaction methods such as the evaporation method, liquid phase reaction methods such as the plating method and solid phase methods such as the sol-gel method may be used to form the electrode layer. When an optically functional thin film according to the invention is used for a light-emitting device that is adapted to take out light from the side of the substrate, it is preferably an electrically conductive transparent thin film typically made of $In_2O_3$, $SnO_2$, ZnO or ITO and doped so as to transmit emitted light. In the case where light is taken out from the top surface, materials primarily consisting of metals, alloys and the like are used.

Figure 6:
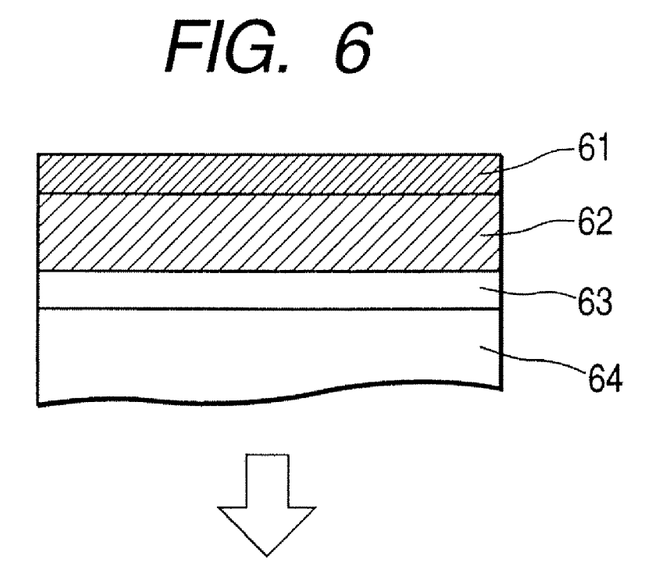
FIG. 6 is a schematic cross sectional view of a phosphor thin film according to the invention.

FIG. 6 schematically illustrates a light-emitting element according to the invention where a light-emitting material according to the invention is used as phosphor for exciting electron beams. In FIG. 6, 61 denotes an electrode film that is typically made of aluminum and referred to as metal back. It takes a role of preventing charge-ups and reflecting light from the phosphor. In FIG. 6, 62 denotes a phosphor film made of a light-emitting material according to the invention, and 63 denotes a transparent electrically conductive film, while 64 denotes a transparent substrate typically made of glass.

When a light-emitting material according to the invention is used as phosphor for exciting electron beams, it is preferably slightly electrically conductive. Then, it is possible to reduce the thickness of or omit the electrode film 61. As a result, incident electron beams can effectively strike the phosphor film.

Now, a light-emitting material according to the invention will be discussed in greater detail below.

Eutectic refers to a substance in which both crystal A and crystal B solidify simultaneously at a given temperature. The temperature is referred to as eutectic temperature and the overall composition is referred to as eutectic composition. The point where eutectic appears on a phase diagram is referred to as eutectic point. A phase diagram where a eutectic point appears is frequently found in two-element systems and also in oxide systems. For example, the $MgO$—$Y_2O_3$ system and the $NiO$—$Y_2O_3$ system produce eutectic phase. In those systems, however, MgO or $Y_2O_3$ and NiO and $Y_2O_3$ exist separately at low temperatures. When such a system is doped slightly with $Eu^{3+}$, the Y part in the $Y_2O_3$ is substituted to form red light-emitting sections $Y_2O_3$:Eu. For example, when the volume ratio of MgO to $Y_2O_3$:Eu is made equal to about 70% and a film of the eutectic phase is formed by sputtering, fine particles or cylinders of $Y_2O_3$:Eu are formed in MgO in a dispersed state.

Beside the above material, $V_2O_5$ and $YVO_4$ form a eutectic phase in a $V_2O_5$—$Y_2O_3$ system and $SiO_2$ and $EuSiO_3$ or $EuSiO_3$ and $Eu_2SiO_4$ form a eutectic phase in an $EuO$—$SiO_2$ system, whereas $WO_3$ and $ZnWO_4$ or $ZnWO_4$ and ZnO form a eutectic phase in a ZnO-WO$_3$ system. YVO$_4$ to which a rare earth element is added forms light-emitting sections in a V$_2$O$_5$—Y$_2$O$_3$ system, while both EuSiO$_3$ and Eu$_2$SiO$_4$ form light-emitting sections in a EuO—SiO$_2$ system.

When a light-emitting material according to the invention is used for an inorganic EL element, the parts of the light-emitting materials are preferably highly insulating and show a low dielectric constant in many cases.

According to the invention, the first and second materials that show a eutectic relationship are both oxides. Combinations of oxides that can be used for the purpose of the present invention include magnesium oxide and an oxide of a rare earth element, nickel oxide and an oxide of a rare earth element, vanadium oxide and a vanadium composite oxide containing a rare earth element, silicon oxide and a silicon composite oxide containing a rare earth element and tungsten oxide or zinc oxide and a tungsten composite oxide containing zinc.

A light-emitting material according to the invention is adapted to produce a phosphor thin film that contains highly densely light-emitting sections so that it can suitably be used for phosphor thin films of inorganic ELs and FEDs.

Now, the present invention will be described further by way of examples.

EXAMPLE 1

An embodiment of light-emitting material according to the invention will also be described here by referring to FIGS. 1A, 1B and 4A.

A quartz substrate is used as substrate in this example. An electrode film 45 is formed by depositing Ti and Au to respective thicknesses of 10 nm and 50 nm on a substrate 46 by magnetron sputtering. Subsequently, a dielectric film 44 is formed by depositing BaTiO$_3$ to a thickness of 2 μm also by magnetron sputtering. Thereafter, a phosphor film 43 is formed in a manner as described below.

A target with a composition showing a volume ratio of MgO to Y$_2$O$_3$:Eu equal to 2 to 1 is prepared. A phosphor film 43 of MgO+Y$_2$O$_3$:Eu is formed to a thickness of 5 μm by magnetron sputtering, using the target. The substrate temperature is varied from the room temperature to 1,000° C. during the sputtering process. Then, a dielectric film 42 of BaTiO$_3$ is formed to a thickness of 2 μm and subsequently a transparent electrically conductive film 41 of ITO is formed to a thickness of 300 nm.

When the obtained film is observed through an electron microscope, it is found that fine particles of Y$_2$O$_3$:Eu are formed in a dispersed state so as to be surrounded by a region of MgO. The average diameter of the fine particles of Y$_2$O$_3$:Eu is between several nanometers and hundreds of several nanometers, although it depends on the film deposition conditions and the crystal is large and clear when the substrate temperature is high in the film deposition process.

When an AC voltage of 1 KHz is applied between the transparent electrode film 41 and the electrode film 45 so as to gradually raise the voltage, emission of red light begins when the voltage gets to 150V. The emitted light is particularly bright when the substrate temperature is not lower than 400° C.

In a nano-structure whose size is characteristically not greater than tens of several nanometers, movements of electrons are confined by the quantum size effect that is attributable to the very small particle diameter. Therefore, the light-emitting performance of a light-emitting material according to the invention is improved when very fine particles of phosphor are used.

EXAMPLE 2

A light-emitting material of an SiO$_2$—EuO system is prepared in this example by using a technique similar to the one used in Example 1.

A p-type Si substrate is used as substrate 46 in this example. An insulating film is formed to a thickness of 10 nm on the substrate 46 by magnetron sputtering. Subsequently, a phosphor film 43 is formed by magnetron sputtering in a manner as described below.

A target with a composition showing a volume ratio of SiO$_2$ to EuO equal to 4 to 1 is prepared. A phosphor film 43 of SiO$_2$+EuO is formed to a thickness of 0.5 μm by magnetron sputtering, using the target. The substrate temperature is varied from the room temperature to 1,000° C. during the sputtering process. Then, an insulating film is formed to a thickness of 10 nm and subsequently a transparent electrically conductive film 41 of ITO is formed to a thickness of 300 nm.

When the obtained film is observed through an electron microscope, it is found that cylinders of EuO are formed in a dispersed state so as to be surrounded by an SiO$_2$ region. When the composition of the target is changed to raise the ratio of the SiO$_2$ content, dispersed fine particles of EuO are formed and surrounded by the SiO$_2$ region. The average diameter of the cylinders or the fine particles of EuO is between several nanometers and hundreds of several nanometers, although it depends on the film deposition conditions and the crystal is large and clear when the substrate temperature is high in the film deposition process.

When a DC voltage is applied between the transparent electrode film 41 and the electrode film 45 so as to gradually raise the voltage, emission of red light begins when the voltage gets to 20V. The emitted light is particularly bright when the substrate temperature is not lower than 400° C.

EXAMPLE 3

A light-emitting material of a V$_2$O$_5$—Y$_2$O$_3$ system is prepared in this example by using a technique similar to the one used in Example 1.

A quartz substrate is used as substrate in this example. An electrode film 45 is formed by depositing Ti and Pt to respective thicknesses of 10 nm and 50 nm on a substrate 46 by magnetron sputtering. Subsequently, a dielectric film 44 is formed by depositing Ta$_2$O$_5$ to a thickness of 0.5 μm also by magnetron sputtering. Thereafter, a phosphor film 43 is formed in a manner as described below.

A target with a composition showing a volume ratio of V$_2$O$_5$ to Y$_2$O$_3$:Eu equal to 5 to 1 is prepared. A phosphor film 43 of V$_2$O$_5$+Y$_2$O$_3$:Eu is formed to a thickness of 1 μm by magnetron sputtering, using the target. The substrate temperature is varied from the room temperature to 1,000° C. during the sputtering process. Then, a dielectric film 42 of BaTiO$_3$ is formed to a thickness of 2 μm and subsequently a transparent electrically conductive film 41 of ITO is formed to a thickness of 300 nm.

When the obtained film is observed through an electron microscope, it is found that fine particles of Y$_2$O$_3$:Eu are formed in a dispersed state so as to be surrounded by a region of V$_2$O$_5$. The average diameter of the fine particles of Y$_2$O$_3$:Eu is between several nanometers and hundreds of several nanometers, although it depends on the film forming conditions and the crystal is large and clear when the substrate temperature is high in the film deposition process.

When an AC voltage of 1 KHz is applied between the transparent electrode film 41 and the electrode film 45 so as to gradually raise the voltage, emission of red light begins when the voltage gets to 150V. The emitted light is particularly bright when the substrate temperature is not lower than 300° C.

EXAMPLE 4

In this example, as shown in FIG. 6, a light-emitting material according to the invention is used as a phosphor thin film for exciting electron beams.

A transparent electrically conductive film 63 of $SnO_2$:F is formed to a thickness of 300 nm on a glass substrate 64 and then NiO and $Y_2O_3$:Eu are deposited thereon to form a film to a thickness of 2 μm by sputtering. NiO and $Y_2O_3$:Eu are made to show a ratio of 2:1 in order to form a phosphor film 62. Then, Al is deposited thereon to form an electrode film 61 to a thickness of 50 nm.

The prepared product is put into a vacuum chamber and irradiated with electron beams to evaluate the phosphor. As a result, it is found that it emits red light. As a result of comparing a known ordinary $Y_2O_3$:Eu thin film and the phosphor thin film, the ordinary phosphor film with no electrode film 61 is easily charged up, while the phosphor film of the present invention with no electrode film 61 is charged up only very slightly.

EXAMPLE 5

In this example, a light-emitting element according to the invention is applied to an image display apparatus, an illumination apparatus or a printing apparatus.

An image display apparatus comprising light-emitting elements according to the invention can be used by linearly arranging the electrodes of the light-emitting elements on the upper and lower surfaces, connecting them by matrix wiring and driving the light-emitting elements. To produce color images, the colors of RGB can be generated by using RGB filters in combination with a light-emitting material adapted to emit white light or by forming films of light-emitting materials that respectively correspond to RGB and patterning them highly precisely. Alternatively, the colors of RGB can be generated by using a blue light-emitting material and converting blue light into green light and red light by means of corresponding phosphors.

A technique of using white light-emitting material, that of laying RGB light-emitting materials in a vertical direction or that of emitting blue rays of light or ultraviolet rays and converting them into RGB rays of light may be employed when a light-emitting element according to the invention is applied to an illumination apparatus.

When a light-emitting element according to the invention is employed to display images, a plurality of pixel sections can be formed by dividing at least the upper side electrode or the lower side electrode into a plurality of electrodes.

When a light-emitting element according to the invention is applied to a printing apparatus, or a printer, it is possible to linearly arrange light-emitting elements and drive them instead of scanning a laser beam by means of a polygon mirror.

EXAMPLE 6

In this example, the diameter of each of the cylinders in a phosphor film according to the invention is made to change continuously and show pointed apexes 13 as shown in FIG. 7 so that a concentrated high electric field may appear at the light-emitting sections when the phosphor film is used to operate as EL element.

Figure 8:
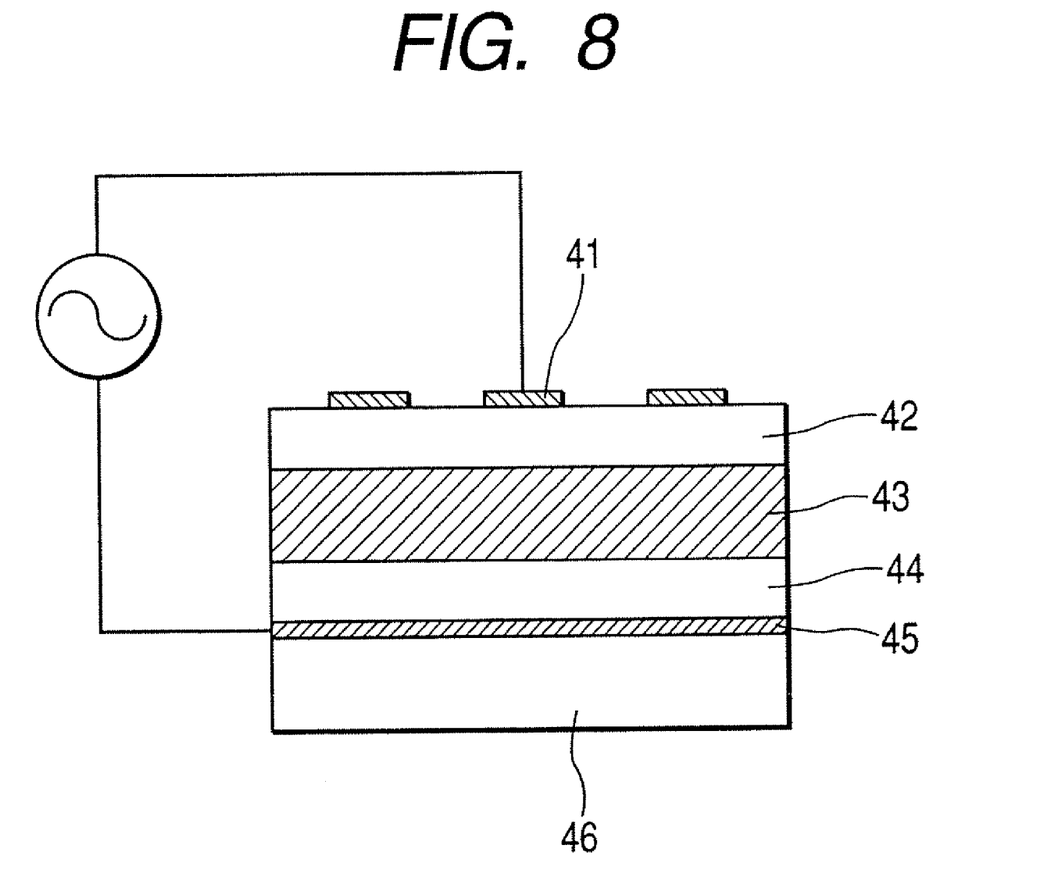
FIG. 8 is a schematic cross sectional view of a light-emitting element for acquiring EL, illustrating the structure thereof.

A quartz substrate is used for the substrate 46 as shown in FIG. 8. An electrode film 45 is formed by depositing Ti and Pt to respective thicknesses of 10 nm and 100 nm on a substrate 46 by magnetron sputtering. Subsequently, a dielectric film 44 is formed by depositing $Ta_2O_5$ to a thickness of 0.5 μm also by magnetron sputtering. Thereafter, a phosphor film 43 is formed in a manner as described below.

Two targets of ZnO and $WO_3$ are used to prepare a phosphor film 43 containing cylinders with pointed apexes formed at the opposite ends by magnetron sputtering, following the sequence as described below.

Firstly, the two targets of ZnO and $WO_3$ are made to produce electric discharges of RF400 W and RF600 W respectively. The two shutters are closed at the beginning. Then, the shutter at the side of the ZnO is opened for film forming for one minute and subsequently the shutter at the side of the $WO_3$ is opened to start forming a eutectic film of ZnO—$WO_3$. Then, the total applied power is continuously reduced to 100 W in 20 minutes, maintaining the ratio of the applied powers of the two targets.

When the total applied power gets to 100 W, the film growth rate is maintained for 40 minutes and, subsequently, the total applied power is raised to 1 kW in 20 minutes. Finally, the shutter at the side of the $WO_3$ is closed and the operation of forming the ZnO film is continued for one minute to produce a phosphor film with a total film thickness of 1 μm. During the phosphor film forming process, the substrate temperature is varied from room temperature to 1,000° C. Thereafter, a $BaTiO_3$ film is formed to a thickness of 2 μm as dielectric film 42. Subsequently, an ITO film is formed as transparent electrically conductive film 41 to a thickness of 300 nm.

When the obtained film is observed through an electron microscope, it is found that dispersed fine pieces of $WO_3$ having pointed apexes and surrounded by a ZnO region are produced. The film forming rate falls as the applied power is reduced. Then, it is possible to raise the surface migration length of sputtered particles on the film surface and the cylinder diameter by gradually reducing the deposition.

Thus, it is possible to prepare nano-composite structures having various different profiles by forming films, controlling the diameter of the cylinders in this way. The average diameter of the cylinders is between several nanometers and hundreds of several nanometers, although it becomes large and clear as the substrate temperature rises.

When an AC voltage of 1 KHz is applied between the transparent electrode film 41 and the electrode film 45 so as to gradually raise the voltage, emission of blue white light begins when the voltage gets to about 120V. The emitted light is particularly bright when the substrate temperature is not lower than 400° C. during the film forming process. The luminance is improved to more than twice if compared with a structure where the opposite ends of cylinders do not have pointed apexes nor are narrowed.

This application claims priority from Japanese Patent Application No. 2004-092402 filed Mar. 26, 2004, and Japanese Patent Application No. 2004-253253 filed Aug. 31, 2004 which are hereby incorporated by reference herein.

What is claimed is:

1. A light-emitting material including a matrix section and light-emitting sections dispersed and buried in the matrix section, said matrix section comprising a first material, said light-emitting sections comprising a second material showing a eutectic relationship with the first material, wherein said first and second materials are any one of the combinations selected from magnesium oxide and an oxide of a rare earth element, nickel oxide and an oxide of a rare earth element, vanadium oxide and a vanadium composite oxide containing a rare earth element, and silicon oxide and a silicon composite oxide containing a rare earth element, and wherein said light-emitting sections contain an activator.

2. The light-emitting material according to claim 1, wherein said light-emitting sections are granular or cylindrical.

3. The light-emitting material according to claim 1, wherein said light-emitting sections have pointed apexes.

* * * * *